United States Patent
Okazaki et al.

(10) Patent No.: US 6,478,358 B1
(45) Date of Patent: Nov. 12, 2002

(54) SEAT DEVICE FOR A VEHICLE

(75) Inventors: Hiroyuki Okazaki, Aichi-ken (JP);
Yukifumi Yamada, Aichi-ken (JP);
Satoshi Hisada, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/468,406

(22) Filed: Dec. 20, 1999

(30) Foreign Application Priority Data

Dec. 18, 1998 (JP) ............................................ 10-361000

(51) Int. Cl.$^7$ ............................. B60N 2/08; B60N 2/12; B60N 2/14; B60N 2/20; B60N 2/30
(52) U.S. Cl. ..................................... 296/65.09; 297/336
(58) Field of Search ........................... 296/65.09, 65.05, 296/66, 69; 297/336, 335, 331

(56) References Cited

U.S. PATENT DOCUMENTS

| | | | | |
|---|---|---|---|---|
| 4,368,916 A | * | 1/1983 | Blasin | 296/65.09 |
| 4,484,776 A | * | 11/1984 | Gokimoto et al. | 296/65.09 |
| 4,484,779 A | * | 11/1984 | Suzuki | 297/331 |
| 4,606,577 A | * | 8/1986 | Hirama et al. | 297/336 |
| 4,627,656 A | * | 12/1986 | Gokimoto et al. | 297/336 |
| 4,869,541 A | * | 9/1989 | Wainwright | 296/65.1 |
| 5,393,116 A | * | 2/1995 | Bolsworth et al. | 297/367 |
| 5,482,345 A | * | 1/1996 | Bolsworth et al. | 297/336 |
| 5,577,805 A | * | 11/1996 | Glinter | 297/335 |
| 5,611,589 A | * | 3/1997 | Fujii et al. | 296/65.1 |
| 5,662,368 A | * | 9/1997 | Ito et al. | 296/65.05 |
| 5,711,505 A | * | 1/1998 | Nemoto | 297/331 |
| 5,810,443 A | * | 9/1998 | Blanchard | 297/336 |
| 5,868,450 A | * | 2/1999 | Hashimoto | 296/65.09 |
| 5,938,286 A | * | 8/1999 | Jones et al. | 297/367 |
| 5,941,591 A | * | 8/1999 | Tsuge et al. | 296/65.09 |
| 6,053,555 A | * | 4/2000 | Neale | 296/65.05 |
| 6,065,804 A | * | 5/2000 | Tanaka et al. | 297/336 |
| 6,079,763 A | * | 6/2000 | Clemente | 296/65.05 |
| 6,135,555 A | * | 10/2000 | Liu et al. | 297/336 |
| 6,174,017 B1 | * | 1/2001 | Salani et al. | 296/65.09 |
| 6,059,345 A1 | * | 5/2001 | Yokota | 297/331 |
| 6,250,704 B1 | * | 6/2001 | Garrido | 296/65.05 |
| 6,345,867 B1 | * | 2/2002 | Hellrung et al. | 297/336 |

OTHER PUBLICATIONS

Toyota SPACIO New Automobile, pp. 4–21 to 4–28, published on Jan. 13, 1997.

* cited by examiner

Primary Examiner—D. Glenn Dayoan
Assistant Examiner—H Gutman
(74) Attorney, Agent, or Firm—Burns, Doane, Swecker & Mathis, LLP (57) ABSTRACT

A seat device for a vehicle includes a seat apparatus rotationally mounted on the floor of the vehicle to permit the seat apparatus to move between a first position in which the seat apparatus is adjacent the floor of the vehicle and a turned over position in which the seat apparatus is upright relative to the floor of the vehicle. The seat apparatus includes a seat back and a seat cushion, with the seat back being pivotally mounted with respect to the seat cushion to permit the seat back to be pivoted between a sitting position and a forwardly folded position on top of the seat cushion. A lock device locks the seat apparatus to the floor of the vehicle and prevents the seat from being moved to the turned over position. A mechanism is also provided for releasing the lock device to permit the seat apparatus to be moved to the turned over position only when the seat back is in the forwardly folded position.

19 Claims, 5 Drawing Sheets

SEAT DEVICE FOR A VEHICLE

FIELD OF THE INVENTION

The present invention generally relates to a vehicle seat. More particularly, the present invention pertains to a vehicle seat device that is adapted to be locked relative to the vehicle floor and that has a seat back that is adapted to be folded to a forward position on the seat cushion.

BACKGROUND OF THE INVENTION

A manual for the Toyota SPACIO New Automobile, pages 4–21 to 4–28, published on Jan. 13, 1997, discloses a seat device which includes a lock device for locking the seat to the vehicle floor, a folding device for folding the seat back, and an operation device for operating the folding device. This seat device can be turned over on the floor while the seat back is in the folded position on the seat cushion by releasing the seat lock.

However, in this seat device, the release of the seat lock can be operated regardless of whether the seat back is in the sitting upright position or in the folded position. This can cause difficulties for the operator and might tend to result in incorrect operation of the seat device.

In light of the foregoing, a need exists for a vehicle seat device that is not as susceptible to the same drawbacks and disadvantages discussed above.

SUMMARY OF THE INVENTION

In light of the foregoing, the present invention provides a seat device that prevents incorrect operation by allowing release of the lock device and movement of the seat to the turning over position only when the seat back is in the forward folded position on the seat cushion.

According to one aspect of the present invention, a seat device for a vehicle includes a seat slide mounted on the vehicle floor, a lock mechanism for locking a seat, including a seat cushion and a seat back, to the floor, a folding device for forwardly folding the seat back of the seat onto the seat cushion of the seat from an upright sitting position to a forward folded position, an operation mechanism for operating the lock mechanism, and an operation limit mechanism located between the folding device and the operation mechanism to allow a lock release operation only when the seat back is in the folded position on the seat cushion and for preventing the lock release operation when the seat back is in the upright sitting position.

According to another aspect of the invention, a seat device for a vehicle includes a seat slide mounted on the floor of the vehicle, a turning over device installed between the floor and the seat slide for turning over a seat, which includes a seat cushion and a seat back, and for holding the seat in the turned over position, a folding device for folding the seat back in the forward position on the seat cushion, an operation member for operating the turning over device and the folding device, an operation limit mechanism to permit operation of the turning over device only when the seat back is in a forward folded position on the seat cushion, and an engagement control mechanism releasing engagement between the operation member and the turning over device when the seat is moved to a predetermined position on the floor.

According to a further aspect of the invention, a seat device for a vehicle includes a seat apparatus rotationally mounted on a floor of the vehicle to permit the seat apparatus to move between a first position in which the seat apparatus is adjacent the floor of the vehicle and a turned over position in which the seat apparatus is upright relative to the floor of the vehicle. The seat apparatus includes a seat back and a seat cushion, with the seat back being pivotally mounted with respect to the seat cushion to permit the seat back to be pivoted between a sitting position and a forwardly folded position on top of the seat cushion. A lock device locks the seat apparatus to the floor of the vehicle and prevents the seat from being moved to the turned over position. A mechanism is provided for releasing the lock device to permit the seat apparatus to be moved to the turned over position only when the seat back is in the forwardly folded position.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
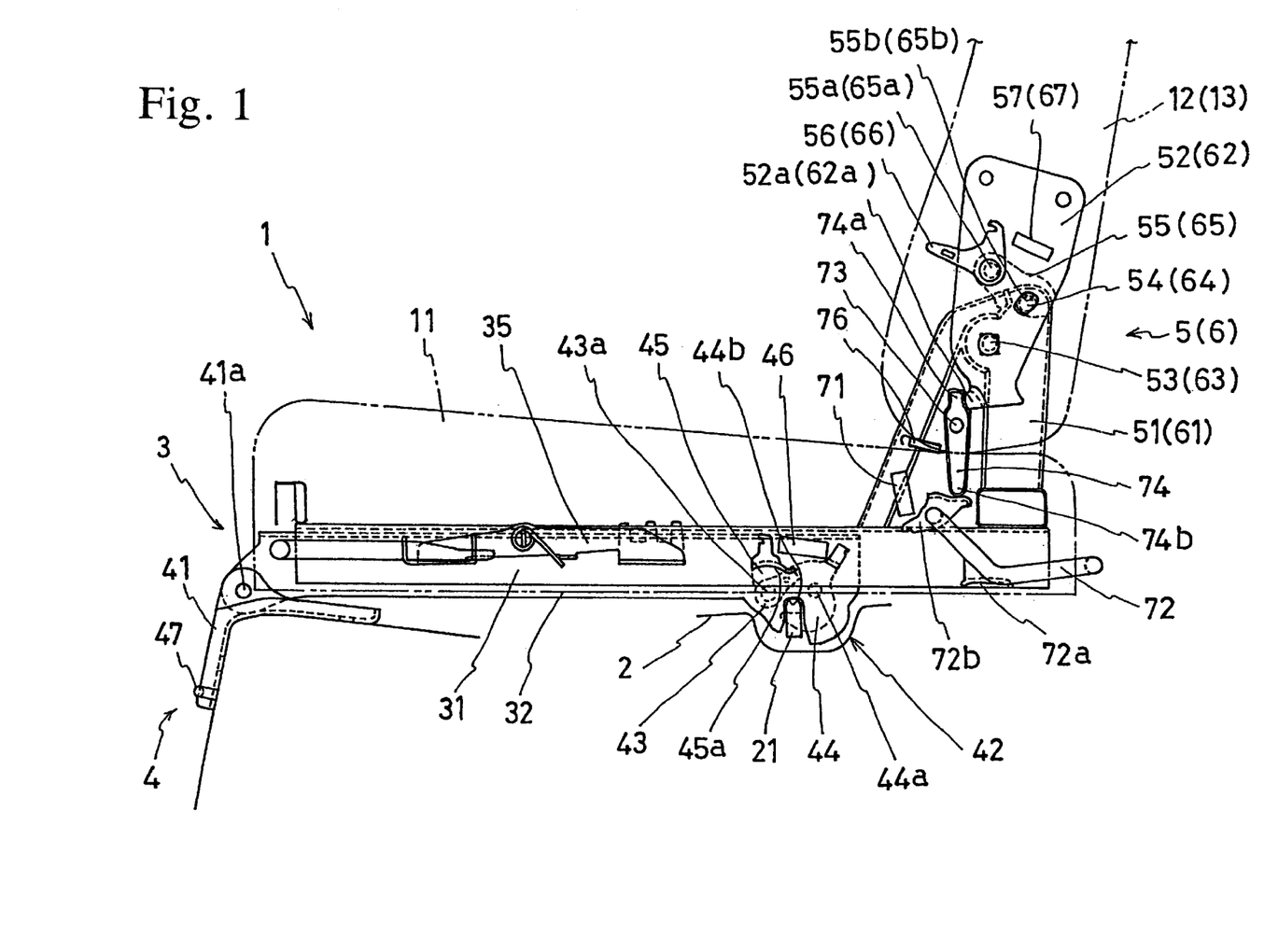
FIG. 1 is a side view of the seat device in accordance with the present invention.
Figure 2:
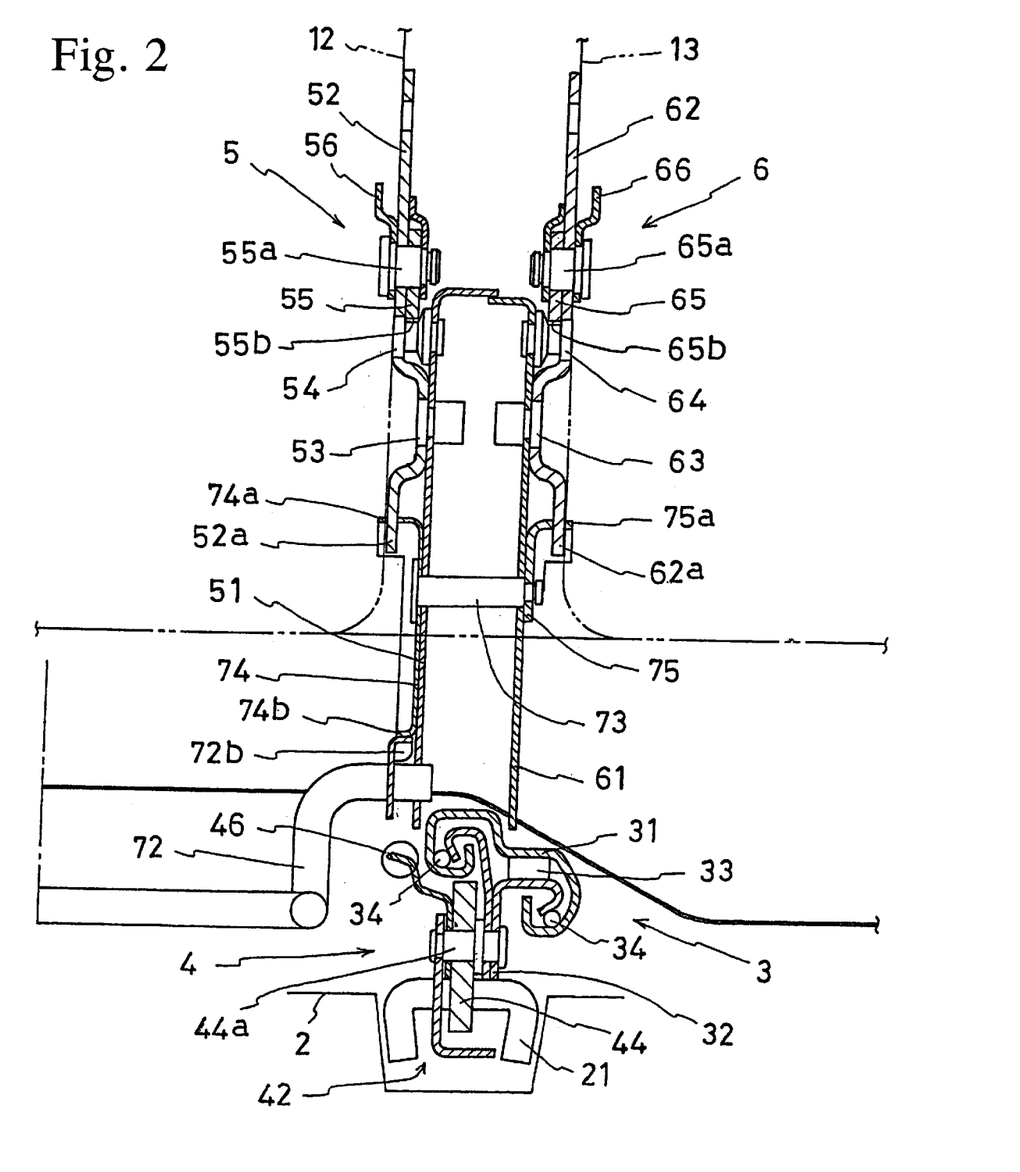
FIG. 2 is a cross-sectional view of the seat device shown in FIG. 1.

Referring initially to FIGS. 1 and 2, the seat device 1 for a vehicle in accordance with a preferred embodiment of the present invention includes a seat cushion 11 and a pair of seat backs 12, 13. The seat device 1 includes seat slides 3 which allow the seat device 1 to be moved back and forth. The seat device 1 also includes a respective folding mechanism 5, 6 associated with each seat back 12, 13. Through operation of these folding mechanisms 5, 6, the seat backs 12, 13 can be folded independently of each other onto the seat cushion 11. The seat device 1 is also adapted to be rotated around an axis at its front portion and turned over on the floor 2 by operating a turning over mechanism 4.

As shown on FIGS. 1 and 2, the seat slides 3 are located rearwardly of the turning over mechanism 4. The seat slides 3 are generally comprised of upper rails 31 secured under the seat cushion to the lower side of the seat cushion and lower rails 32 to which the turning over mechanism 4 is attached. The upper rail 31 and the lower rail 32 have an elongated shape extending in the direction of the vehicle floor 2. The upper rail 31 is mounted on the lower rail 32 and is able to slide relative to the lower rail 32 by virtue of rollers 33 and balls 34. The seat device 1 is thus able to slide back and forth relative to the floor 2. The slide operation of the upper rail 31 on the lower rail 32 is controlled by a lock plate 35 which is rotationally attached on the upper rail 31 and able to engage the lower rail 32 so that the seat can be adjusted to the required or desired position.

Figure 5:
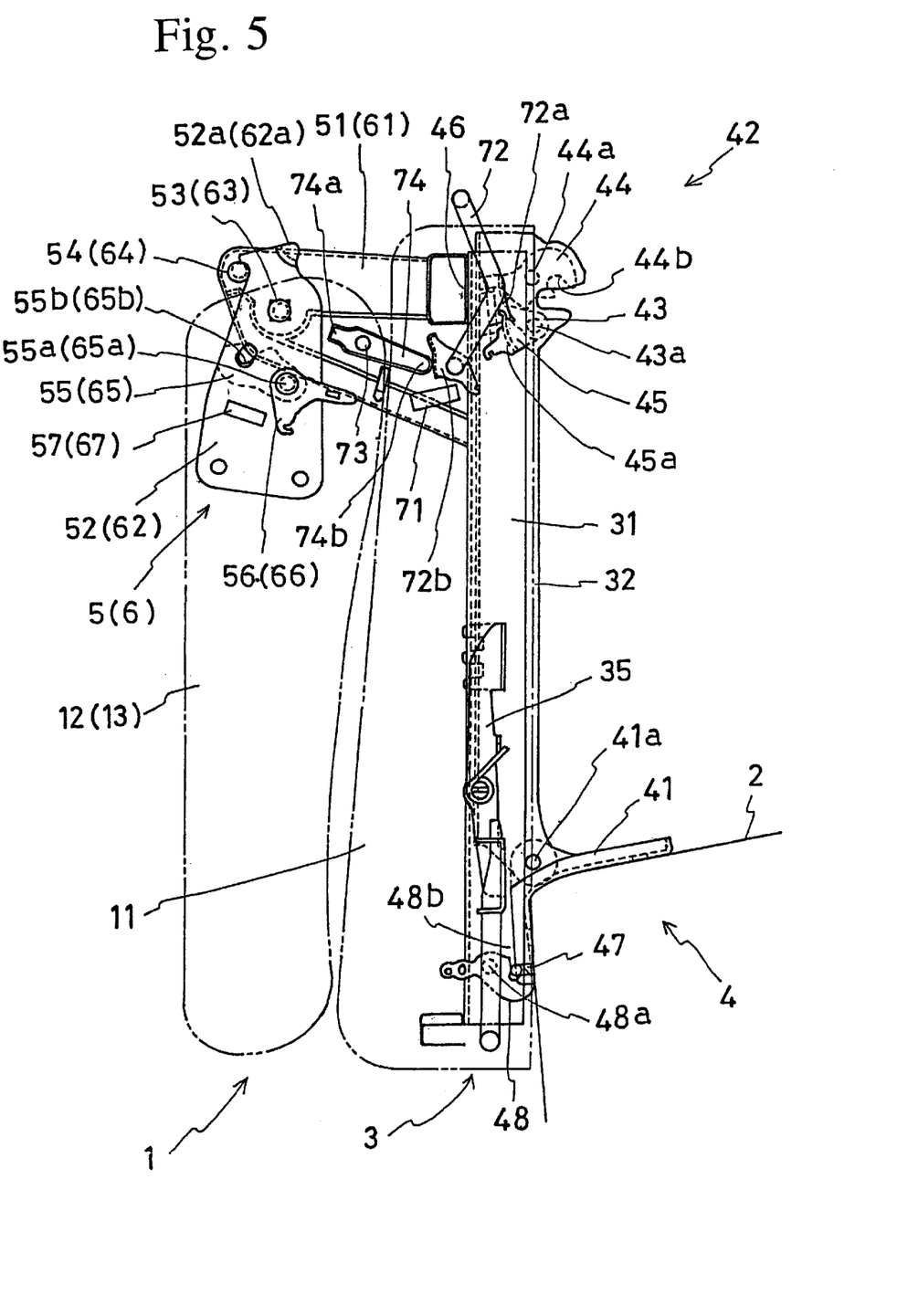
FIG. 5 is a side view of the seat device shown in FIG. 4 in the turned over position.

As shown on FIGS. 1 and 2, the turning over device 4 is located between the vehicle floor 2 and the seat slides 3. The turning over device 4 includes a hinge bracket 41 and a lock mechanism 42. The hinge bracket 41 is secured on the vehicle floor 2 by way of bolts or another suitable connection mechanism, and is held rotationally on the lower rail 32 front end portion by pins 41a. The lock mechanism 42 includes a pawl 43 and a latch 44. The pawl 43 and the latch 44 are held rotationally on the rear end portion of the lower rail 32 by respective pins 43a, 44a. The latch 44 is provided with a U-shaped groove 44b and is arranged to rotate for purposes of causing the U-shaped groove 44b to engage with and disengage from a striker 21. The pawl 43 is also arranged to rotate, and is adapted to engage or disengage with the latch 44, and control the rotation of latch 44. A release lever 45 is held on the pin 43a that holds the pawl 43, and the release lever 45 rotates together with the pawl 43. A tension spring 46 is arranged between the release lever 45 and the latch 44. The pawl 43 is always rotationally biased by the tension spring 46 via the release lever 45 to engage with the latch 44. The latch 44 is always biased by the tension spring 46 to disengage from the striker 21. When the pawl 43 is rotated against the force of the spring 46 through operation of the release lever 45, the pawl 43 disengages from the latch 44. The latch 44 is made to rotate by the spring 46, and the engagement of the latch 44 and the striker 21 is released, thus constituting the function of the lock mechanism. After the lock mechanism 42 operation, by raising up the rear end portion of the lower rail 32 and rotating the lower rail 32 around the axis of the pin 41a, the turning over of the seat device 1 on the floor 2 is achieved. FIG. 5 illustrates the seat device 1 in the turned over position.

As shown in FIG. 5, an engagement pin 47 is positioned on a suitable portion of the hinge bracket 41. A ratchet 48 provided with a U-shaped groove 48b is pivotally supported by a pin 48a at the front end of the upper rail 31. The ratchet 48 is arranged to rotate and cause the U-shaped groove 48b to engage with or disengage from the engagement pin 47.

Figure 3:
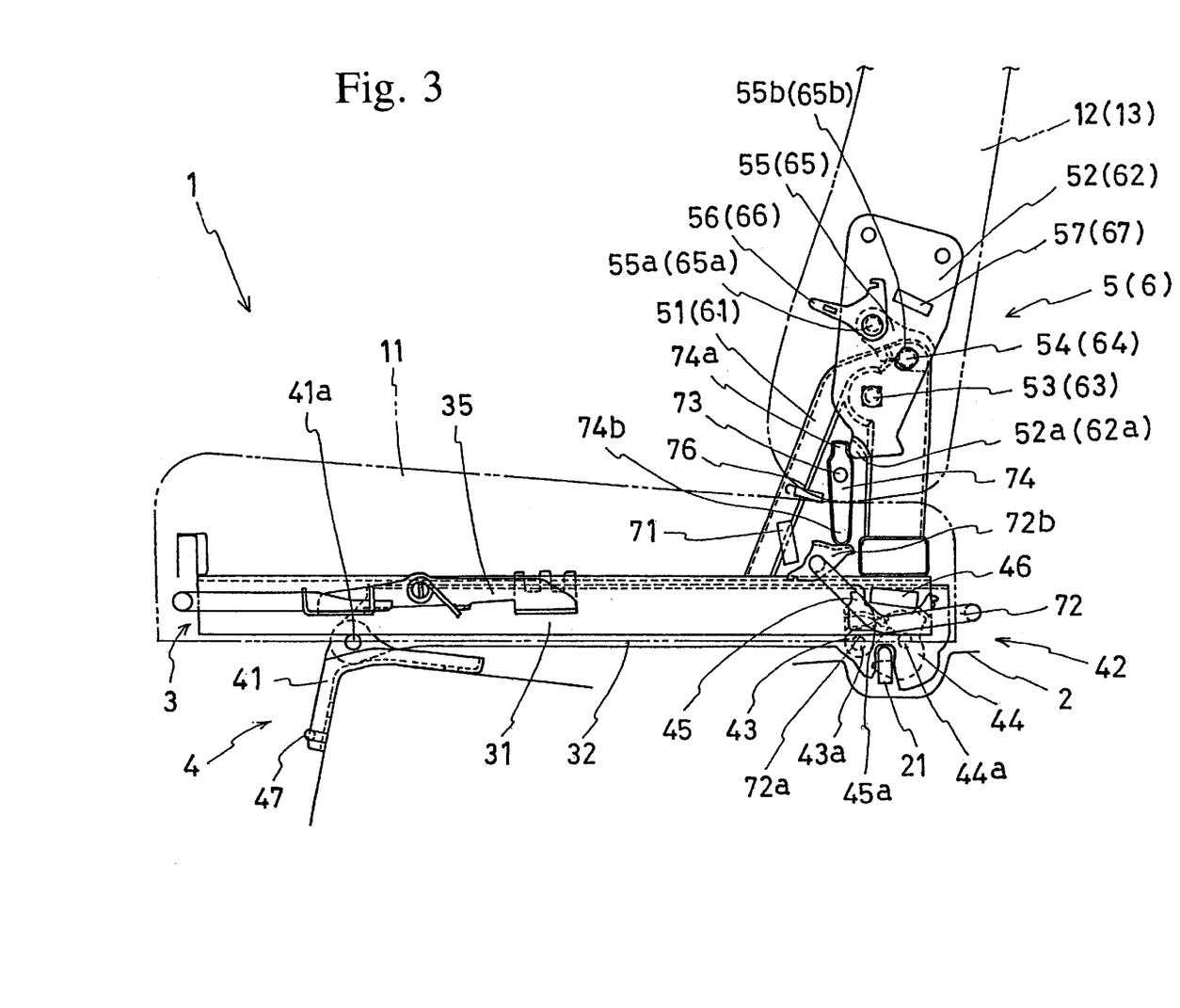
FIG. 3 is a side view of the seat device shown in FIG. 1 in the sitting position and with the seat slid forward.
Figure 4:
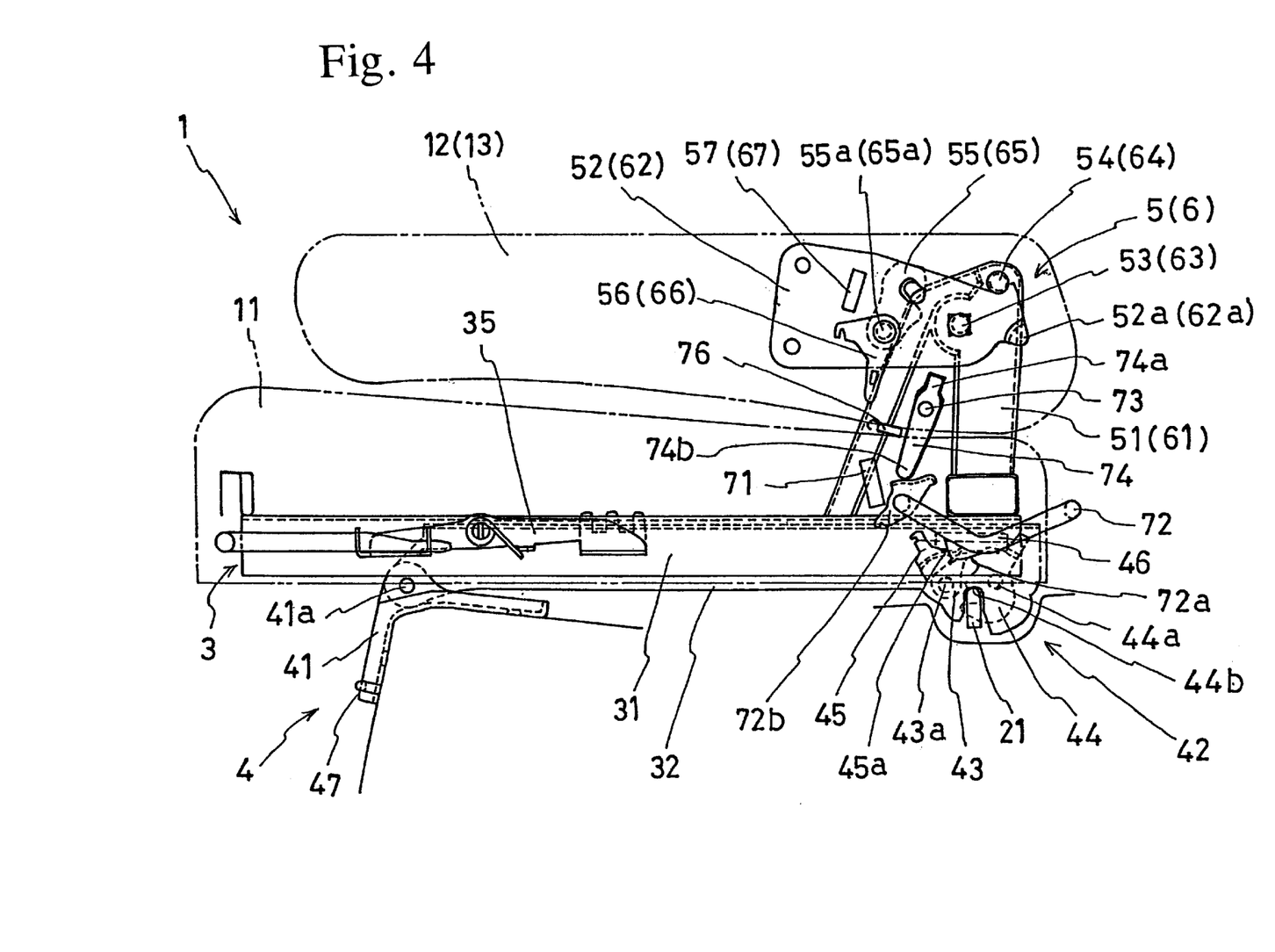
FIG. 4 is a side view of the seat device shown in FIG. 1 in which the seat back is in the forward folded position.

As shown in FIG. 1 and FIG. 2, a flange part 45a is formed on the release lever 45 of the lock mechanism 42. An operation handle 72 is supported on the upper rail 31 in a swinging manner. A blocking plate 72a which is adapted to engage the flange part 45a of the release lever 45 is fixed on the operation handle 72. The blocking plate 72a is connected with the ratchet 48 by way of a rod (not shown). As illustrated in FIG. 3 and FIG. 4, through swinging movement of the operation handle 72, the blocking plate 72a is moved to engage the lower face of the flange part 45a, and then the release lever 45 is rotated together with the pawl 43, whereby the lock mechanism 42 is operated. When the lock mechanism 42 is operated, the ratchet 48 also rotates via the rod to be ready to receive the engagement pin 47 in the U-shaped groove 48b. Then, the seat device 1 can be pivoted and moved to the turned over position. After the seat device 1 is moved to the turned over position, the operation handle 72 is released and returns to the original position by the spring force associated with a tension spring 71 shown in FIG. 1. As the ratchet 48 is rotated via the rod, the engagement pin 47 is received in the U-shaped groove 48b, whereby the ratchet 48 and the engagement pin 47 engage each other. As shown in FIG. 5, the seat device is thus supported in the turned over position in which the seat cushion 11, as well as the upper and lower rails 31, 32, are raised relative to the vehicle floor 2.

When the seat device 1 is in the turned over position as shown in FIG. 5, the seat device can be returned to the original horizontal position on the vehicle floor by operating the operation handle 72. This causes the ratchet 48 to rotate via the rod so that the engagement of the ratchet 48 with the pin 47 is released, thus allowing the seat device to be set in the original position in a manner reverse to that described above.

As shown in FIG. 1, FIG. 3 and FIG. 4, the engagement between the flange part 45a and the blocking plate 72a is achieved only when the upper rail 31 slides on the lower rail 32 and reaches a position at which the flange part 45a is situated along the movement path of the blocking plate 72a as seen in FIGS. 3 and 4. In all other positions, the blocking plate 72a swings in vain as depicted in FIG. 1. Therefore, the lock mechanism 42 operation is possible only when the seat device 1 is in the determined position. This determined position of the upper rail 31 over the lower rail 32 is the only position where the ratchet 48 can engage with or disengage from the engagement pin 47 when the seat device 1 has been turned over. In this way, the seat device 1 is firmly held in the turned over position.

As shown in FIG. 1 and FIG. 2, the seat folding mechanism 5 is located between the seat cushion 11 and the seat back 12. The seat folding mechanism 5 includes a lower arm 51 attached on the seat cushion 11 at the lower end portion of the lower arm 51, and an upper arm 52 attached on the seat back 12 at the upper end portion of the upper arm 52. The lower end portion of the upper arm 52 is pivotally supported on the lower arm 51 by a pin 53. A ratchet 55 is pivotally held on the upper arm 52 by a pin 55a, and a standing pin 54 is fixed on the upper portion of the lower arm 51. The ratchet 55 possesses a U-shaped groove 55b that is adapted to engage with or disengage from the pin 54. An operating lever 56 is also pivotally held on the pin 55a. This operating lever 56 is adapted to operate together with the ratchet 55. A tension spring 57 is positioned between the operating lever 56 and the upper arm 52. The tension spring 57 applies a force via the operating lever 56 and the pin 55a to the ratchet 55, and the ratchet 55 is biased in the engagement direction to engage the pin 54. As shown in FIG. 1, by the engagement of the pin 54 with the ratchet 55, the position of the upper arm 52 with respect to the lower arm 51 is secured, and the seat back 12 is maintained in the upright sitting position with respect to the seat cushion 11.

As shown in FIG. 4, operating the operating lever 56 causes the ratchet 55 to rotate and thereby release the engagement with the pin 54. The upper arm 52 is thus able to rotate on the lower arm 51. Rotating the upper arm 52 through ninety degrees with respect to the lower arm 51 causes the seat back 12 to be moved to the forward folded position with respect to the seat cushion 11.

As shown in FIG. 1 and FIG. 2, the seat folding mechanism 6 is located between the seat cushion 11 and the seat back 13, and includes a lower arm 61 having a lower end portion that is attached on the seat cushion 11 and an upper arm 62 having an upper portion attached on the seat back 13. The upper arm 62 is pivotally supported on the upper end portion of the lower arm 61 by a pin 63. A standing pin 64 is fixed on the upper end portion of the lower arm 61. A ratchet 65 is pivotally supported by a pin 65a on the upper arm 62. The ratchet 65 is provided with a U-shaped groove 65b and is adapted to rotate for purposes of causing the U-shaped groove 65b to engage with or disengage from the pin 64. A tension spring 67 is attached between the operating lever 66 and the upper arm 62. The force of the spring 67 is applied via the operating lever 66 and the pin 65a to the ratchet 65, and the ratchet 65 is thus biased to engage with the pin 64. As shown in FIG. 1, through engagement of the pin 64 with the ratchet 65, the rotation of the upper arm 62 relative to the lower arm 61 is controlled, with the seat back 13 being maintained in the upright sitting position relative to the seat cushion 11. Also, as shown in FIG. 4, by operating the operating lever 66, the ratchet 65 is released from engagement with the pin 64, and the upper arm 62 is able to rotate relative to the lower arm 61. Rotating the upper arm 62 through ninety degrees relative to the lower arm 61 enables the seat back 13 to be positioned in the forward folding position relative to the seat cushion 11.

As shown in FIG. 1 and FIG. 2, a plunger portion 52a in the form of a flange is formed at the lower end portion of the upper arm 52 of the seat folding mechanism 5. Similarly, a plunger portion 62a in the form of a flange is formed at the lower end portion of the upper arm 62 of the seat folding mechanism 6. A bracket 72b is attached on the operation handle 72 to rotate together with the operation handle 72 on their common rotational center. A pin 73 is rotationally installed on and passes through both the lower arm 51 of the folding mechanism 5 and the lower arm 61 of the folding mechanism 6. On the lower arm 51 side end portion of the pin 73, a first limit lever 74 is fixed at around its center. The first limit lever 74 is elongated in the up and down direction as seen in FIG. 2, and has an upper end 74a positioned in the moving path of the plunger portion 52a of the upper arm 52 to engage with the plunger portion 52a when the upper arm 52 rotates relative to the lower arm 51. The lower end 74b of the first limit lever 74 is adapted to engage the bracket 72b of the operation handle 72.

A second limit lever 75 is fixed on the lower arm 61 side end portion of the pin 73. The upper end 75a of the second limit lever 75 is arranged in the moving path of the plunger portion 62a of the upper arm 62. A tension spring 76 is arranged between the first limit lever 74 and the lower arm 51. The limit levers 74, 75 are biased by the force of the spring 76 to cause the upper ends 74a, 75a of the limit levers 74, 75 to engage the plunger portions 52a, 62a respectively.

As shown in FIG. 3, when the seat backs 12, 13 are in the upright sitting position, the upper ends 74a, 75a of the first and second limit levers 74, 75 respectively contact the plunger portions 52a, 62a of the upper arms 52, 62, and their rotation is controlled by the spring 76 force. Also, the lower end 74b of the first limit lever 74 engages the bracket 72b of the operation handle 72. In this state, when the operation handle 72 is moved, the blocking plate 72a of the operation handle 72 engages the flange part 45a of the release lever 45 and the release lever 45 is urged to rotate against the force of the spring 46. However, because the bracket 72b of the operation handle 72 engages the lower end 74b of the first limit lever 74, the release lever 45 cannot be rotated and so the movement of the operation handle 72 is limited. Therefore, in the upright sitting position of the seat back 12, the lock mechanism 42 does not release and the seat turning over operation is not possible.

As shown in FIG. 4, when the seat backs 12, 13 are in the forward folded position, the plunger portions 52a, 62a of the upper arms 52, 62 move away from the upper ends 74a, 75a of the first and second limit levers 74, 75, and disengage from the plunger portions 52a, 62a of the upper arm 52, 62. Thus the first and second limit levers 74, 75 are rotated together by the force of the spring 76, and the engagement of the lower end 74b of the first limit lever with the bracket 72b of the operation handle 72 is released. As shown in FIG. 4, when the operation handle 72 is operated in the above situation, the blocking plate 72a of the operation handle 72 is able to engage the lower face of the flange part 45a so that the release lever 45 is turned against the force of the tension spring 46, thus actuating the lock mechanism 42 and allowing the seat device 1 to be turned over.

When the seat back 12 is in the folded down position and the seat back 13 is in the upright sitting position, though the engagement between the upper end 74a of the limit lever 74 and the plunger portion 52a of the upper arm 52 is released, the engagement between the upper end 75a of the second limit lever 75 and the plunger portion 62a of the upper arm 62 is not released. Thus rotation of the first and second limit levers 74, 75 by the spring 76 force does not occur. If the operation handle 72 is operated, the engagement between the bracket 72b of the operation handle 72 and the lower end 74b of the first limit lever 74 prevents the operation of the operation handle 72. As a result, when only the seat back 12 is in the folded down position, the lock mechanism 42 cannot be operated and so the seat device 1 cannot be turned over.

During the opposite situation to that described above, when only the seat back 13 is in the folded down position and the seat back 12 is in the upright sitting position, the mechanism functions in the same way.

It is thus seen that by virtue of the present invention, the operation of the lock release is possible only when the seat backs are in the folded down position, with the operation of the lock release being prevented when either or both of the seat backs are in the upright sitting position. This thus avoids the difficulties discussed above associated with other known seat devices of this type.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat device of a vehicle comprising:
   a seat slide for being mounted on a floor of the vehicle;
   means for locking a seat, including a seat cushion and a seat back, to the floor;
   a folding device for forwardly folding the seat back of the seat onto the seat cushion of the seat from an upright sitting position to a forward folded position;
   an operation mechanism for operating the means for locking; and
   an operation limit mechanism located between the folding device and the operation mechanism to allow a lock release operation only when the seat back is in the folded position on the seat cushion and for preventing the lock release operation when the seat back is in the upright sitting position.

2. The seat device for a vehicle according to claim 1, wherein the operation limit mechanism includes a limit lever engaging said operation mechanism to control said operation mechanism.

3. The seat device for a vehicle according to claim 1, wherein the seat slide supports said seat for sliding movement, and including an engagement mechanism to engage or disengage said operation mechanism with said means for locking when said seat slides.

4. A seat device for a vehicle comprising:
   a seat slide for being mounted on a floor of the vehicle;
   a turning over device for being installed between the floor and the seat slide for turning over a seat, which includes a seat cushion and a seat back, and for holding the seat in a turned over position;

a folding device for folding the seat back in a forward folded position on the seat cushion;

an operation member for operating the turning over device and the folding device;

an operation limit mechanism to permit operation of the turning over device only when the seat back is in the forward folded position on the seat cushion, and an engagement control mechanism to release engagement between said operation member and said turning over device when the seat is moved to a predetermined position.

5. The seat device for a vehicle according to claim 4, wherein the turning over device includes a hinge bracket for being secured to the floor of the vehicle and a lock mechanism mounted on the seat slide for locking the seat slide with respect to the floor of the vehicle, a front end of said seat slide being pivotally connected to the hinge bracket.

6. The seat device for a vehicle according to claim 5, wherein the lock mechanism includes a pawl and a latch that are each rotationally mounted on the seat slide, said latch possessing a groove that engages a striker and said pawl being adapted to engage the latch to prevent the latch from rotating to thereby maintain engagement of the latch with the striker.

7. The seat device for a vehicle according to claim 5, wherein the lock mechanism includes a ratchet pivotally supported on the seat slide and possessing a groove, the hinge bracket including an engagement pin positionable in said groove.

8. A seat device for a vehicle comprising:

a seat apparatus for being rotationally mounted on a floor of the vehicle to permit the seat apparatus to move between a first position in which the seat apparatus is adjacent the floor of the vehicle and a turned over position in which the seat apparatus is upright relative to the floor of the vehicle, said seat apparatus including a seat back and a seat cushion, said seat back being pivotally mounted with respect to the seat cushion to permit the seat back to be pivoted between a sitting position and a forwardly folded position on top of the seat cushion;

a lock device for locking the seat apparatus to the floor of the vehicle and preventing the seat apparatus from being moved to the turned over position;

releasing means for releasing the lock device, the releasing means including an operation handle disposed to be separate from a release lever that is fixed with the lock device, the operation handle being disposed to contact the release lever during release operation of the operation handle; and permitting means for permitting the seat apparatus to be moved to the turned over position only when the seat back is in the forwardly folded position, the permitting means including a limit lever which is movable relative to the seat back to limit the release operation of the operation handle.

9. The seat device for a vehicle according to claim 8, including a hinge bracket for rotationally mounting the seat apparatus on the floor of the vehicle, said hinge bracket being provided with an engagement pin, and including a ratchet mounted on the seat apparatus and provided with a groove that receives the engagement pin when the seat apparatus is moved to the turned over position.

10. The seat device for a vehicle according to claim 8, wherein the seat apparatus includes a seat slide comprised of an upper rail on which the seat cushion is mounted and a lower rail.

11. The seat device for a vehicle according to claim 8, wherein the lock device includes a pawl and a latch that are each rotationally mounted on a portion of the seat apparatus, said latch possessing a groove that engages a striker and said pawl being adapted to engage the latch to prevent the latch from rotating to thereby maintain engagement of the latch with the striker.

12. The seat device for a vehicle according to claim 11, wherein the release lever is fixed to the pawl, said operation handle being supported on the seat apparatus, a portion of said operation handle contacting a portion of said release lever when the operation handle is operated to release engagement of said pawl with said latch to thereby permit release of said lock device.

13. The seat device for a vehicle according to claim 12, wherein said seat back is pivotally mounted with respect to said seat cushion by a folding mechanism, said folding mechanism including a lower arm attached to the seat cushion and an upper arm secured to the seat back, said upper arm and said lower arm being pivotally connected to one another, the limit lever being mounted on the lower arm, said limit lever engaging a portion of the operation handle when the seat back is in the sitting position to prevent operation of the operation handle from releasing engagement of said pawl with said latch and thereby prevent release of said lock device.

14. The seat device for a vehicle according to claim 8, wherein said seat back includes a first seat back and a second seat back which are both pivotally mounted with respect to the seat cushion to permit each of the first and second seat backs to be separately pivoted between the sitting position and the forwardly folded position on top of the seat cushion.

15. The seat device for a vehicle according to claim 14, including means for preventing release of said lock device until both said first seat back and said second seat back are in the forwardly folded position.

16. A seat device for a vehicle comprising:

a seat apparatus for being rotationally mounted on a floor of the vehicle to permit the seat apparatus to move between a first position in which the seat apparatus is adjacent the floor of the vehicle and a turned over position in which the seat apparatus is upright relative to the floor of the vehicle, said seat apparatus including a seat back and a seat cushion, said seat back being pivotally mounted with respect to the seat cushion to permit the seat back to be pivoted between a sitting position and a forwardly folded position on top of the seat cushion;

a lock device for locking the seat apparatus to the floor of the vehicle and preventing the seat apparatus from being moved to the turned over position;

a release lever operatively associated with the lock device;

an operation handle disposed to be separate from the release lever and disposed to contact the release lever during release operation of the operation handle to release the lock device;

an operating lever which upon operation permits the seat back to be pivoted from the sitting position to the forwardly folded position; and means for permitting the seat apparatus to be moved to the turned over position only when the seat back is in the forwardly folded position, the means for permitting including a limit lever which is movable relative to the seat back to limit the release operation of the operation handle when the seat back is in the sitting position.

17. The seat device for a vehicle according to claim 16, wherein the lock device includes a pawl and a latch each rotationally mounted on a portion of the seat apparatus, said latch possessing a groove that is adapted to engage a striker and said pawl being adapted to engage the latch to prevent the latch from rotating to thereby maintain engagement of the latch with the striker.

18. The seat device for a vehicle according to claim 17, wherein the release lever is fixed to the pawl and the operation handle is supported on the seat apparatus, a portion of the operation handle contacting a portion of the release lever when the operation handle is operated to release engagement of the pawl with the latch to thereby permit release of the lock device.

19. The seat device for a vehicle according to claim 18, wherein the seat back is pivotally mounted with respect to the seat cushion by a folding mechanism that includes a lower arm attached to the seat cushion and an upper arm secured to the seat back, the upper arm and the lower arm being pivotally connected to one another, the limit lever being mounted on the lower arm, the limit lever engaging a portion of the operation handle when the seat back is in the sitting position to prevent operation of the operation handle from releasing engagement of the pawl with the latch and thereby prevent release of the lock device.

* * * * *